United States Patent Office 3,575,981
Patented Apr. 20, 1971

3,575,981
DIALKYLATED VAT DYESTUFFS OF THE AMINO DIPHTHALOYL PHENANTHRIDONE SERIES
Charles W. C. Stein, Westfield, N.J., assignor to GAF Corporation
No Drawing. Filed Dec. 18, 1967, Ser. No. 691,243
Int. Cl. C07d *39/00*
U.S. Cl. 260—272
2 Claims

ABSTRACT OF THE DISCLOSURE

An olive green vat dyestuff of relatively low infra-red reflectance having the formula:

(I)

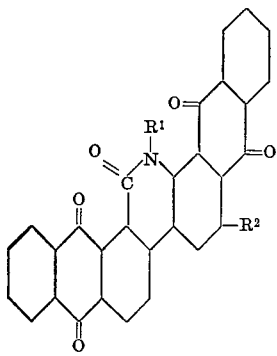

wherein $R^1$ is alkyl or cycloalkyl of 1–6 carbon atoms, and $R^2$ is H or $NHR^1$.

---

This invention relates to new vat dyestuffs of the diphthaloyl phenanthridone type effective for producing on cellulose fibers olive green shades of relatively low infra-red reflectance characteristics.

Due to the increased usage of infra-red light sources and observation methods utilizing such light, the problem of camouflage in modern warfare has become much more complex. Dyestuffs for uniforms must be of such character that they are capable of blending into the terrain when viewed with infra-red light. Since the background infra-red reflection, of a natural woodland setting averages somewhere between 20 and 30% infra-red reflection, the percentage reflection of the dyed uniforms must lie in this range in order for those uniforms to be inconspicuous to the enemy observer.

Most vat dyes which have been used in the past for military uniforms have suitable drab camouflaging colors. However most of these dyes also show a high degree of reflectance of infra-red light.

D.P. 499,352 (1930) (Friedlander 17, 1384) describes the preparation of diphthaloyl phenanthridone by the potassium dichromate oxidation of a Vat Oliver Green B suspension in dilute sulfuric acid. Such a vat dyestuff imparts exceptionally low infra-red reflectance to the dyed cloth. However it suffers from poor light-fastness and chlorine-fastness properties.

It is an object of this invention to provide novel vat dyestuffs which will not be subject to one or more of the above disadvantages. Another object of the invention is the provision of such dyestuffs having an infra-red reflectance of less than 30%. Still another object of the invention is the provision of such dyestuffs having improved chlorine and light-fastness properties. Other objects and advantages will appear as the description proceeds.

The attainment of the above objects is made possible by the present invention which comprises the provision of dyestuffs of the above Formula I. These dyestuffs have been found to yield olive green dyeings having relatively low infra-red reflectance, though slightly higher than the unhalogenated precursors, and relatively improved chlorine and light-fastness characteristics especially desirable for military use. Since their infra-red reflectances broadly range from about 15 to 25%, they may be admixed with other dyes, often necessary to achieve a particular shade, which have higher reflectance, to produce dye mixtures whose infra-red reflectances still fall within the desired 20–30% range.

In the above Formula I, $R^2$ is preferably H, and $R^1$ is preferably methyl, but may be ethyl, propyl, isopropyl, butyl, isobutyl, pentyl, hexyl, cyclopentyl, or cyclohexyl or the like. These dyestuffs are readily prepared by reaction of 1 mole of Bz-1-bromobenzanthrone with 1 mole of 1-HNR$^1$-anthraquinone or 1,4 - bis(HNR$^1$)-anthraquinone in the presence of alkali metal carbonate and copper compounds such as cuprous chloride and copper or copper oxide and cupric acetate, followed by isolating and subjecting the resulting reaction product to ring closure conditions such as fusion in alkali-ethanol and then oxidizing the resulting ring closed product to the phenanthridone by treatment with alkali metal bichromate in dilute sulfuric acid suspension medium. Another method involves alkylation of Vat Olive Green B (color index vat green No. 3) prior to oxidation with bichromate as by reaction with the suitable alkanol and sulfuric acid. Still another method involves a similar alkylation treatment subsequent to the oxidation, i.e. alkylation of the diphthaloyl phenanthridone. Neither of these two latter methods are however as good as the preferred method since it is difficult to thereby achieve complete alkylation.

The dyestuffs of this invention dye cellulose such as cotton and other vegetable fibers from an alkali hydrosulfite vat in olive green shades of good fastness properties and infra-red reflectances of about 15–25%.

The following examples are only illustrative of preferred embodiments of the invention and are not to be regarded as limitative. All parts and proportions referred to herein and in the appended claims are by weight unless otherwise indicated.

EXAMPLE I (a) 1-(N-methyl-1′-anthraquinylamino)-benzanthrone

Two hundred eighty six parts of nitrobenzene are mixed with 27.8 parts of Bz-1-bromobenzanthrone, 23.4 parts of 1-(N-methylamino)anthraquinone, 20.4 parts of soda ash, 1 part cuprous chloride and 0.25 part powdered copper. The mixture is heated to reflux at 210–215° C. until the reaction is complete. The mixture is cooled slowly to room temperature, filtered and the cake sucked dry. The cake is then freed of nitrobenzene by steam-stripping. Upon filtration and drying the above intermediate is obtained in a yield of 80% of theory.

(b) N-methyl Olive Green B (by ring closure)

Twenty four parts of the intermediate from (a) are added to a potassium hydroxide-ethanol melt prepared by heating 53.5 parts potassium hydroxide and 67 parts ethyl alcohol until a uniform melt is obtained. The mixture is then heated to reflux at 115–120° C. with distillation as needed to maintain this temperature. Hold the fusion at 115–120° C. for 2 hours, then, while distilling off ethanol, add 77 parts of water keeping temperature of melt at 100–120° C. After initial charge of water is added, a further charge of 22 parts of water is added, the mixture cooled to 50–60° C. and drowned into 500 parts water at 60° C. The mixture is aerated for 2–3 hours, filtered and washed neutral with hot water. A 90% yield of solids is obtained as a wet presscake. A portion of this N-methyl Olive Green B converted into a paste by the usual techniques dyes cotton a bright olive green color but shows a high reflectance to infra-red light.

(c) N-methyl olive green phenanthridone (N-methyl diphthaloyl phenanthridone)

Ten parts of the solids as wet presscake from (b) above are suspended in 180 parts of water and 83 parts of 96% sulfuric acid added slowly. The suspension is heated to 90–95° C. and 67 parts of an 8% aqueous bichromate solution are dropped in over a period of ½–1 hour. After holding at 90–95° C. with a positive test for sodium bichromate for 1 hour the mixture is filtered and washed neutral with hot water. A quantitative yield of the dyestuff of Formula I above, wherein $R^1$ is $CH_3$ and $R^2$ is H, is obtained which, when converted into a dyestuff paste dyes cotton (paddings) from the vat in olive green shades. The paddings show a low infra-red reflectance and have improved light and chlorine-fastness as compared with the unmethylated product.

EXAMPLE II

One step methylation and oxidation

Sixty parts of Vat Olive Green B (Color Index Vat Green #3) of the formula:

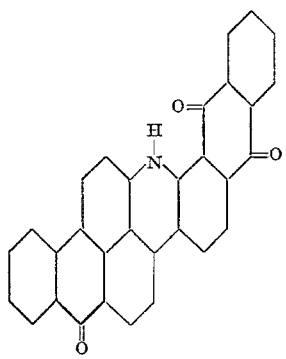

are slowly added to 1470 parts of 96% sulfuric acid at room temperature. After stirring for 1 hour 397 parts of methyl alcohol are added dropwise, keeping the temperature below 35° C. When all is added, the mixture is heated to 125–130° C. and held for 6 hours. It is then cooled to 30° C. and poured into 3000 parts of ice and water. After stirring ½ hour it is filtered and washed neutral to Congo paper. The presscake is then slurried in 1300 parts of water containing 470 parts of 96% sulfuric acid. The suspension is heated to 99–95° C. and 400 parts 8% aqueous sodium bichromate solution are dropped in over a period of ½–1 hour. After holding at 90–95° C. with a positive test for sodium bichromate for 1 hour, the mixture is filtered and washed neutral with hot water. A dye paste made from this presscake dyes cotton in olive green shades with low infra-red reflectance.

EXAMPLE III

N'-methylamino-N-methyl olive green phenanthridone

The procedure of Example I(a), (b) and (c) is repeated except that an equivalent amount of 1,4-bis(N-methylamino)anthraquinone is used in (a) instead of the 1-(N-methylamino)anthraquinone. The product, yielding cotton dyeings of relatively low infra-red reflectance and improved fastness properties, has the formula:

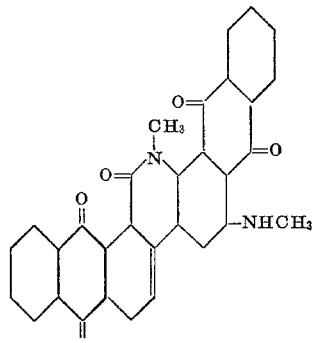

This invention has been disclosed with respect to certain preferred embodiments, and it will be understood that modifications and variations thereof will become obvious to persons skilled in the art and are intended to be included within the spirit and purview of this application and the scope of the appended claims.

I claim:
1. A dyestuff of the formula

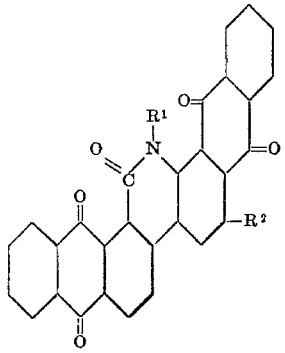

wherein
$R^1$ is $C_{1-6}$ alkyl or $C_{4-6}$ cycloalkyl, and
$R^2$ is $NHR^1$.
2. A dyestuff as defined in claim 1 wherein $R^1$ is $CH_3$.

References Cited

UNITED STATES PATENTS

| | | | |
|---|---|---|---|
| 1,897,439 | 2/1933 | Neresheimer et al. | 260—272 |
| 2,157,991 | 5/1939 | Mieg et al. | 260—272 |

DONALD G. DAUS, Primary Examiner

U.S. Cl. X.R.

260—352, 378, 687; 8—34